United States Patent
Jung

[11] Patent Number: 6,163,343
[45] Date of Patent: Dec. 19, 2000

[54] ELECTRONIC APPARATUS AND METHOD FOR INDEPENDENTLY RESETTING FUNCTIONAL MODE UNITS OF A MULTI-FUNCTIONAL MODE SYSTEM

[75] Inventor: Chang-Joo Jung, Suwon, Rep. of Korea

[73] Assignee: Samsung Electronics Co., Ltd., Kyungki-do, Rep. of Korea

[21] Appl. No.: 09/157,312

[22] Filed: Sep. 21, 1998

[30] Foreign Application Priority Data

Sep. 20, 1997 [KR] Rep. of Korea ............... 97-47873

[51] Int. Cl.$^7$ ................................. H04N 9/475
[52] U.S. Cl. .................. 348/515; 348/730; 386/100
[58] Field of Search ..................... 348/730, 705, 348/552, 571, 513, 512, 515; 386/100

[56] References Cited

U.S. PATENT DOCUMENTS

| | | | |
|---|---|---|---|
| 5,384,642 | 1/1995 | Sim | 386/100 |
| 5,387,943 | 2/1995 | Silver | 348/515 |
| 5,543,937 | 8/1996 | Hamai et al. | 386/100 |
| 5,572,261 | 11/1996 | Cooper | 348/515 |
| 5,642,171 | 6/1997 | Baumgartner et al. | 348/515 |
| 5,661,728 | 8/1997 | Finotello | 348/515 |
| 5,677,731 | 10/1997 | Kato | 348/189 |
| 5,877,815 | 3/1999 | Tsujimura | 348/515 |

*Primary Examiner*—Victor R. Kostak
*Attorney, Agent, or Firm*—Sughrue, Mion, Zinn, Macpeak & Seas, PLLC

[57] ABSTRACT

An electronic apparatus having a reset circuit and a resetting method are provided. The electric apparatus includes at least two functional mode blocks, a controller for controlling the operations of the functional mode blocks, and a reset circuit for selectively resetting only a corresponding functional mode block when any one mode block operates abnormally. The resetting method includes the steps of detecting whether either functional mode block operates abnormally, and resetting the corresponding functional mode block on the basis of the detected result. Accordingly, only a corresponding mode block is reset when one of a plurality of functional mode blocks which are operatively controlled by a microcomputer system operates abnormally. As a result, time delay of the system can be prevented and power consumption can be reduced.

7 Claims, 2 Drawing Sheets

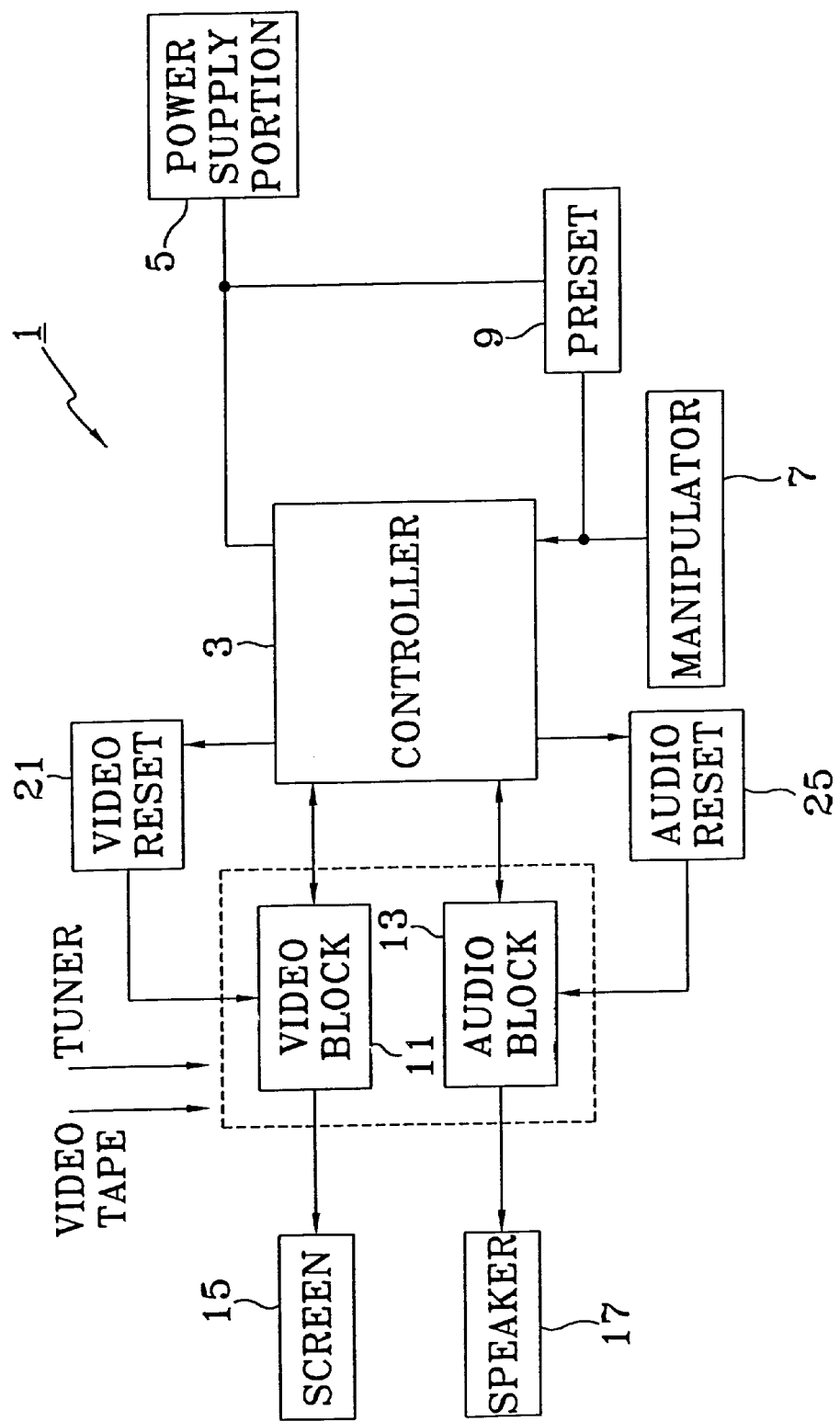

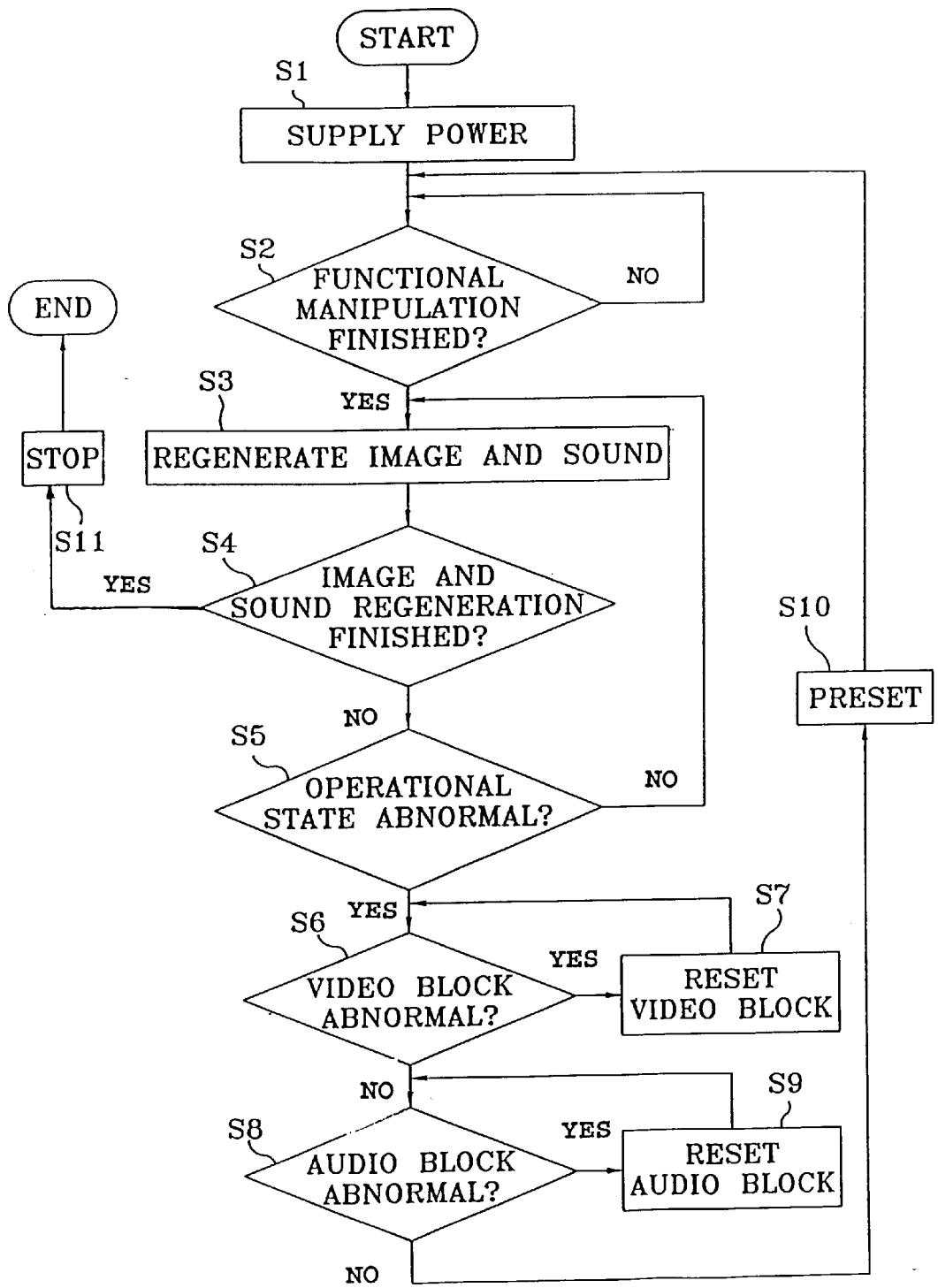

ELECTRONIC APPARATUS AND METHOD FOR INDEPENDENTLY RESETTING FUNCTIONAL MODE UNITS OF A MULTI-FUNCTIONAL MODE SYSTEM

BACKGROUND OF THE INVENTION

1. Field of the Invention

The present invention relates to an electronic apparatus having a reset circuit and a resetting method for an electronic apparatus. More particularly, the present invention relates to a reset control circuit and method for resetting only a single functional mode block which operates abnormally among a plurality of functional mode blocks which are operatively controlled by a microcomputer system.

2. Description of the Related Art

Microcomputer systems are used to receive and display television (TV) wave signals on a display screen as a video image while simultaneously reproducing the TV wave signals via a speaker as an audio sound. Further, the microcomputer system is advantageous when a stereophonic broadcasting signal is received and reproduced as an audio sound. In particular, an audio signal contained in an FM radio signal, an AM radio signal, a magnetic tape and/or a video disc is selectively reproduced as audio sound.

In the microcomputer system, power may be turned off during reproducing video images and audio sound from a received signal, and a latch condition can occur due to external factors such as an electrostatic phenomenon. In this case, the entire system should be necessarily reset, during which the working contents stored in a random access memory (RAM) are erased and, as a result, sequential work cannot be performed. To solve this problem, the microcomputer system may utilize a backup power source such as a battery or a capacitor so that after power is turned on again, the working contents stored in the RAM can be used.

Further, the above-described conventional microcomputer system should reset the entire system even in the case when a partial latch condition occurs due to an abnormal operation of one of a plurality of functional mode blocks. In this case, a power loss occurs due to an on/off operation of the power and a time delay occurs due to an initialization of the system until the system returns to the proceeding working states. This being the case, a user should manipulate the above operation which causes the user to be inconvenienced.

SUMMARY OF THE INVENTION

To solve the above problems, it is an object of the present invention to provide an electronic apparatus having a reset control circuit, and a reset control method, for resetting only a single functional mode block which operates abnormally among a plurality of functional mode blocks which are operatively controlled by a microcomputer system.

To accomplish the above object of the present invention, there is provided an electronic apparatus comprising: a plurality of functional mode blocks; a controller for controlling the operations of the plurality of functional mode blocks; and a reset circuit for selectively resetting only a functional mode block which operates abnormally among the plurality of functional mode blocks. The controller detects the operational state of each functional mode block and outputs a resetting signal to the resetting means when either mode block operates abnormally, thereby resetting the corresponding functional mode block.

According to another aspect of the present invention, the plurality of functional mode blocks includes a video processing block and an audio processing block.

According to the another aspect of the present invention, there is provided a resetting method for resetting an electronic apparatus having a plurality of functional mode blocks, the resetting method comprising the steps of: detecting whether any of the plurality of functional mode blocks is operating abnormally; and resetting only those functional mode units for which an abnormal operational state is detected.

BRIEF DESCRIPTION OF THE DRAWINGS

These and other features, aspects and advantages of the present invention will become better understood with reference to the following detailed description and accompanying drawings, wherein:

FIG. 1 is a block diagram showing an electronic apparatus according to the present invention.

FIG. 2 is a flow-chart diagram for explaining a resetting method of an electronic apparatus according to the present invention.

DETAILED DESCRIPTION OF THE INVENTION

Referring to FIG. 1, an electronic apparatus according to the present invention includes a controller 3, functional mode blocks or units 11 and 13 which are operatively controlled by the controller 3, and reset circuits 21 and 25 for resetting the functional mode blocks 11 and 13, respectively, based on an output signal of the controller 11. In the drawing, for convenience of explanation of this embodiment, the functional mode blocks 11 and 13 are implemented by a video block 11 for displaying a received TV signal on a display screen 15 as a video image and an audio block 13 for reproducing an audio sound via a speaker 17. The electric apparatus further includes a power supply portion 5 for supplying power, a manipulator 7 for manipulating the operational state of the system 1, and a preset portion 9 for initializing the system. The controller 3 controls the video block 11 and the audio block 13 on the basis of an internally stored program and a manipulation signal provided by the manipulator 7, and reproduces the video image and the audio sound via the display screen 15 and a speaker 17, respectively. The preset portion 9 presets and initializes the system 1 when the system 1 is latched or turned off due to an unequal power supply or electrostatic phenomenon which may occur during operation of the system 1.

The reset circuits 21 and 25 are implemented by a video reset circuit 21 attached to the video block 11 and an audio reset circuit 25 attached to the audio block 13. The audio and video reset circuits 21 and 25 are connected to the controller 3 and reset the corresponding video and audio blocks 11 and 13 according to an output reset signal of the controller 3. The controller 3 communicates with the video block 11 and the audio block 13 and provides the reset signal to the video reset circuit 21 or the audio reset circuit 25 when a signal is not received by the controller 3 from either the video block 11 and the audio block 13. The video reset circuit 21 or the audio reset circuit 25 receiving the reset signal switches the power to reset the video block 11 or the audio block 13. As a result, it is possible to individually reset either the video block 11 or the audio block 13.

Further, the video and audio reset circuits 21 and 25, respectively attached to the video block 11 and the audio block 13 for switching the power of the video and audio blocks 11 and 13 on according to the reset signal output from the controller 3 to thereby perform an individual reset operation, can be easily implemented by a person skilled in the art. Thus, the detailed description thereof will be omitted.

FIG. 2 is a flow-chart diagram for explaining a resetting method of an electronic apparatus according to the present invention. If power is supplied via a power supply portion 5 (S1), the controller 3 starts operation of the system 1 according to a manipulation signal from the manipulator 7 and an internally stored program (S2). The video block 11 processes a video signal supplied from a tuner or a video tape according to the operation signal from the controller 3 and displays the result on the screen 15 as an image (S3). At the same time, the audio block 13 also processes an audio signal from the tuner or the video tape and regenerates the result via the speaker 17 as an audio (S3).

During the above operation, the controller 3 confirms whether a video and audio reproduction operation completes (S4) If the reproduction has completed, the operation of the system 1 stops (S11). If not, it is confirmed whether the operational state of the system 1 is abnormal (S5). If the operation state is normal, the video and audio reproduction operation is continuously performed via the video block 11 and the audio block 13 (S3).

If it is confirmed that the system 1 operates abnormally, the controller 3 first detects whether the operational state of the video block 11 is abnormal (S6). At this time, for example, if it is confirmed that the video block 11 abnormally operates due to the latch generated by the unequal power supply or the external electrostatic phenomenon, the controller 3 resets the video block (S7). If the video block 11 operates normally, it is confirmed whether the operational state of the audio block 13 is abnormal (S8). Here, if the audio block 13 operates abnormally, the audio block 13 is reset (S9). In this case, the sequence for confirming whether the video block 11 and the audio block 13 operate normally can be reversed.

If the audio block 13 operates normally, the controller 3 determines that the system 1 operates abnormally and resets the system 1 to the initial state (S10). After that, the system 1 performs the operation of reproducing the video and audio again according to the above sequence, on the basis of the manipulation signal from the manipulator 7 and the program stored in the controller 3 (S2 and S3).

As described above, the electronic apparatus and the resetting method according to the present invention can reset the functional mode blocks individually when either one of the video block 11 and the audio block 13 operates abnormally. Accordingly, inconvenience due to a time delay can be eliminated. For example, in the case that the audio block 13 operates abnormally, the video is continuously regenerated and then the audio block 13 is reset for a short time when a user does not recognize the abnormality of the audio block 13. As a result, the satisfaction degree of the system 1 can be enhanced.

The electronic apparatus and the resetting method according to the present invention also presets and initializes the system 1 in the same manner as the conventional art, in the case that the power is unequally supplied to the system 1 or the system 1 operates abnormally due to the electrostatic phenomenon. However, in the case that either one of the blocks 11 and 13 operates abnormally, the corresponding reset portions 21 and 25 are individually reset. Accordingly, the entire system 1 does not need to be reset, which can prevent the increase of the power consumption due to the on/off operation of the power.

Meanwhile, in the above described embodiment and drawings, the functional blocks of the microcomputer system have been limited into the video block 11 and the audio block 13, for convenience of explanation. However, a variety of functional blocks can be adopted, for example, using an FM radio, an AM radio, a disc recorder, a magnetic tape, and a video disc. In this case, the above-described object and effect can be accomplished by simply implementing a corresponding reset portion attached to each of the functional blocks.

As described above, the present invention resets only a corresponding mode block when either one of a plurality of functional mode blocks which are operatively controlled by a microcomputer system operates abnormally. As a result, time delay of the system can be prevented and power consumption can be reduced.

What is claimed is:

1. An electronic apparatus comprising:

a plurality of functional mode units each performing a function in said electronic apparatus;

a controller for controlling operations of the plurality of functional mode units; and a reset circuit for selectively placing into a predetermined initial state by switching the power of only a functional mode unit which operates abnormally among the plurality of functional mode units.

2. The electronic apparatus according to claim 1, wherein said controller detects an operational state of each of the plurality of functional mode units and outputs a reset signal to the reset circuit when one of the plurality of mode units operates abnormally to place a corresponding functional mode unit having a detected abnormal operational state into a predetermined initial state by switching the power of only the functional mode unit operating abnormally and simultaneously controlling functional mode units operating normally to continue operation.

3. The electronic apparatus according to claim 2, wherein said plurality of functional mode units includes a video processing unit and an audio processing unit.

4. A resetting method for resetting an electronic apparatus comprising a plurality of functional mode units, the resetting method comprising the steps of:

detecting whether any of said plurality of functional mode units is operating abnormally; and selectively placing into a predetermined initial state only those functional mode units for which an abnormal operational state is detected, wherein said initial state is caused by switching the power that is provided to the abnormally functioning mode unit.

5. A resetting method for resetting an electronic apparatus comprising a plurality of functional mode units including a video processing unit and an audio processing unit, the resetting method comprising the steps of:

determining whether an operational state of the electronic apparatus is abnormal;

determining whether operational states of the video processing unit and the audio processing unit are abnormal if the operational state of the electronic apparatus is determined to be abnormal;

resetting, by selectively placing into a predetermined initial state by switching the power, the video processing unit if the operational state of the video processing unit is determined to be abnormal;

resetting, by selectively placing into a predetermined initial state by switching the power, the audio processing unit if the operational state of the audio processing unit is determined to be abnormal; and resetting, by selectively placing into a predetermined initial state by switching the power, the entire apparatus if the operational states of the video processing unit and the audio processing units is determined to be normal.

6. An electronic apparatus comprising:

a plurality of functional blocks operative to provide display signals to respective display devices;

a plurality of respective reset devices corresponding to each of said functional blocks and operative to place said corresponding functional block into a predetermined initial state by switching the power of the corresponding functional block upon receipt of a corresponding reset signal;

a controller operative to detect whether any of said functional blocks is operating abnormally and to provide said corresponding reset signal to the respective reset device of each abnormally operating functional block and not providing said reset signal to any normally operating functional blocks.

7. An electronic apparatus in accordance with claim 6 wherein said plurality of functional blocks includes an audio block and a video block providing said display devices with respective audio and video display signals and wherein said audio block is placed into said predetermined initial state if said controller determines the audio block is operating abnormally and said video block is controlled to continuously regenerate said video display signals if the video block is not determined to be operating abnormally.

* * * * *